United States Patent
Naitou

(10) Patent No.: US 10,882,188 B2
(45) Date of Patent: Jan. 5, 2021

(54) CONTROLLER AND CONTROL METHOD FOR COLLABORATIVE ROBOT

(71) Applicant: Fanuc Corporation, Yamanashi (JP)

(72) Inventor: Yasuhiro Naitou, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 86 days.

(21) Appl. No.: 16/288,364

(22) Filed: Feb. 28, 2019

(65) Prior Publication Data
US 2019/0283253 A1 Sep. 19, 2019

(30) Foreign Application Priority Data

Mar. 14, 2018 (JP) ................................ 2018-046375

(51) Int. Cl.
*B25J 9/16* (2006.01)
*B25J 9/00* (2006.01)
*B65G 43/08* (2006.01)
*B25J 13/08* (2006.01)

(52) U.S. Cl.
CPC .......... *B25J 9/1666* (2013.01); *B25J 9/0093* (2013.01); *B25J 9/1651* (2013.01); *B25J 9/1669* (2013.01); *B25J 9/1676* (2013.01); *B25J 9/1694* (2013.01); *B25J 13/081* (2013.01); *B65G 43/08* (2013.01)

(58) Field of Classification Search
CPC ............................. B25J 9/1666; B25J 9/1674
See application file for complete search history.

(56) References Cited

U.S. PATENT DOCUMENTS

| 10,369,691 | B2 * | 8/2019 | Yamazaki | B25J 9/0087 |
| 10,556,353 | B2 * | 2/2020 | Su | B25J 9/1638 |
| 2006/0145647 | A1 * | 7/2006 | Kitatsuji | G05B 19/414 318/568.11 |
| 2009/0112362 | A1 * | 4/2009 | Nishi | G05B 19/425 700/264 |
| 2010/0191372 | A1 * | 7/2010 | Nihei | B25J 9/1676 700/245 |
| 2011/0010012 | A1 * | 1/2011 | Murayama | B25J 19/06 700/260 |
| 2012/0328404 | A1 | 12/2012 | Froelich et al. | |

(Continued)

FOREIGN PATENT DOCUMENTS

| CN | 102762343 A | 10/2012 |
| CN | 104723350 A | 6/2015 |

(Continued)

*Primary Examiner* — Thomas Randazzo
(74) *Attorney, Agent, or Firm* — RatnerPrestia

(57) ABSTRACT

A robot controller and a robot control method, capable of preventing an operator from being sandwiched between a robot and a workpiece, when a conveyor for conveying the workpiece is stopped. The robot controller is configured to output a robot stop command when a conveyor starts the stop operation thereof. The robot stop command includes at least one of: a first stop command by which, when a movable section of the robot is positioned anterior to the workpiece, the movable section is moved at a higher velocity than the conveyor, and then is stopped after traveling a distance longer than a coasting distance of the conveyor; and a second stop command by which, when the movable section is positioned posterior to the workpiece, the movable section is moved at a lower velocity than the conveyor, and then is stopped after traveling a distance shorter than the coasting distance.

3 Claims, 2 Drawing Sheets

(56) References Cited

U.S. PATENT DOCUMENTS

| | | | |
|---|---|---|---|
| 2013/0158709 A1* | 6/2013 | Shi | B25J 5/02 |
| | | | 700/259 |
| 2015/0209961 A1* | 7/2015 | Komatsu | B25J 9/1676 |
| | | | 700/255 |
| 2016/0089787 A1 | 3/2016 | Kuroshita | |
| 2016/0224012 A1* | 8/2016 | Hunt | B25J 9/1676 |
| 2018/0126562 A1* | 5/2018 | Inaba | G05B 19/41815 |
| 2018/0304469 A1* | 10/2018 | Higuchi | G06K 9/00342 |
| 2019/0061155 A1* | 2/2019 | Hashimoto | B25J 9/1666 |
| 2019/0061179 A1 | 2/2019 | Natori et al. | |
| 2019/0160668 A1 | 5/2019 | Oyama | |

FOREIGN PATENT DOCUMENTS

| | | |
|---|---|---|
| CN | 105459113 A | 4/2016 |
| EP | 0084523 A2 | 7/1983 |
| JP | 2004-203312 A | 7/2004 |
| JP | 2006347754 A | 12/2006 |
| JP | 2009178842 A | 8/2009 |
| JP | 2009-202281 A | 9/2009 |
| JP | 2013-169616 A | 9/2013 |
| JP | 2014-140944 A | 8/2014 |
| JP | 2019098410 A | 6/2019 |
| WO | 2017154303 A1 | 9/2018 |

* cited by examiner

CONTROLLER AND CONTROL METHOD FOR COLLABORATIVE ROBOT

CROSS-REFERENCE TO RELATED APPLICATIONS

This application is a new U.S. Patent Application that claims benefit of Japanese Patent Application No. 2018-046375, filed Mar. 14, 2018, the disclosure of this application is being incorporated herein by reference in its entirety for all purposes.

BACKGROUND OF THE INVENTION

1. Field of the Invention

The present invention relates to a robot controller and a robot control method for controlling a collaborative robot.

2. Description of the Related Art

In the prior art, a technique to carry out an operation is well known, in which a robot attaches components to an object such as a car body conveyed by a conveyor, etc. (e.g., see JP 2013-169616 A).

On the other hand, a technique to prevent a robot and/or a workpiece from being damaged, when a conveyor is suddenly stopped or accelerated, is well known (e.g., see JP 2014-140944 A and JP 2009-202281 A). Further, a technique to prevent car parts and/or an operator from being damaged, when an outer force is accidentally applied to the car parts or a jig thereof, is well known (e.g., see JP 2004-203312 A).

In the prior art, an operation for attaching components to a workpiece being conveyed by a conveyor is usually carried out by a human (operator), and thus it is desired that such an operation is automatically performed by a robot. In this regard, since it is not practical that the robot performs all of operations, from the aspect of cost and technology, it is proposed that a part of operations, which have been carried out by the human, is performed by the robot. In such a case, since the human and the robot share the same working area, a collaborative robot, having a function to stop the motion thereof for safety when the operator contacts the robot, is used.

In case that the collaborative robot performs an operation for a workpiece being moved by a conveyor, the robot stops the motion thereof for safety, when the operator comes into contact with the robot. However, in when the conveyor continues to move after the robot is stopped, the workpiece may collide with the stopped robot, whereby the workpiece and/or the robot may be damaged. Further, the operator may be injured by being sandwiched between the workpiece and the robot.

SUMMARY OF THE INVENTION

One aspect of the present disclosure is a robot controller configured to control a robot, the robot being configured to perform an operation for a workpiece conveyed by a convey section configured to move in a predetermined convey direction, and being located at a position different from the convey section, the robot controller comprising: a robot stop command section configured to output a robot stop command for stopping a motion of the robot when the convey section starts a stop motion, wherein the robot stop command includes at least one of: a first stop command by which, when a movable section of the robot is positioned anterior to the workpiece with respect to the convey direction, the movable section is moved at a higher velocity than the convey section with respect to the convey direction, and the movable section is stopped after the movable section travels a second coasting distance which is longer than a first coasting distance of the convey section with respect to the convey direction; and a second stop command by which, when the movable section of the robot is positioned posterior to the workpiece with respect to the convey direction, the movable section is moved at a lower velocity than the convey section with respect to the convey direction, and the movable section is stopped after the movable section travels a third coasting distance which is shorter than the first coasting distance of the convey section with respect to the convey direction.

Another aspect of the present disclosure is a robot control method of controlling a robot, the robot being configured to perform an operation for a workpiece conveyed by a convey section configured to move in a predetermined convey direction, and being located at a position different from the convey section, the robot control method comprising: outputting a robot stop command for stopping a motion of the robot when the convey section starts a stop motion, wherein the robot stop command includes at least one of: a first stop command by which, when a movable section of the robot is positioned anterior to the workpiece with respect to the convey direction, the movable section is moved at a higher velocity than the convey section with respect to the convey direction, and the movable section is stopped after the movable section travels a second coasting distance which is longer than a first coasting distance of the convey section with respect to the convey direction; and a second stop command by which, when the movable section of the robot is positioned posterior to the workpiece with respect to the convey direction, the movable section is moved at a lower velocity than the convey section with respect to the convey direction, and the movable section is stopped after the movable section travels a third coasting distance which is shorter than the first coasting distance of the convey section with respect to the convey direction.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
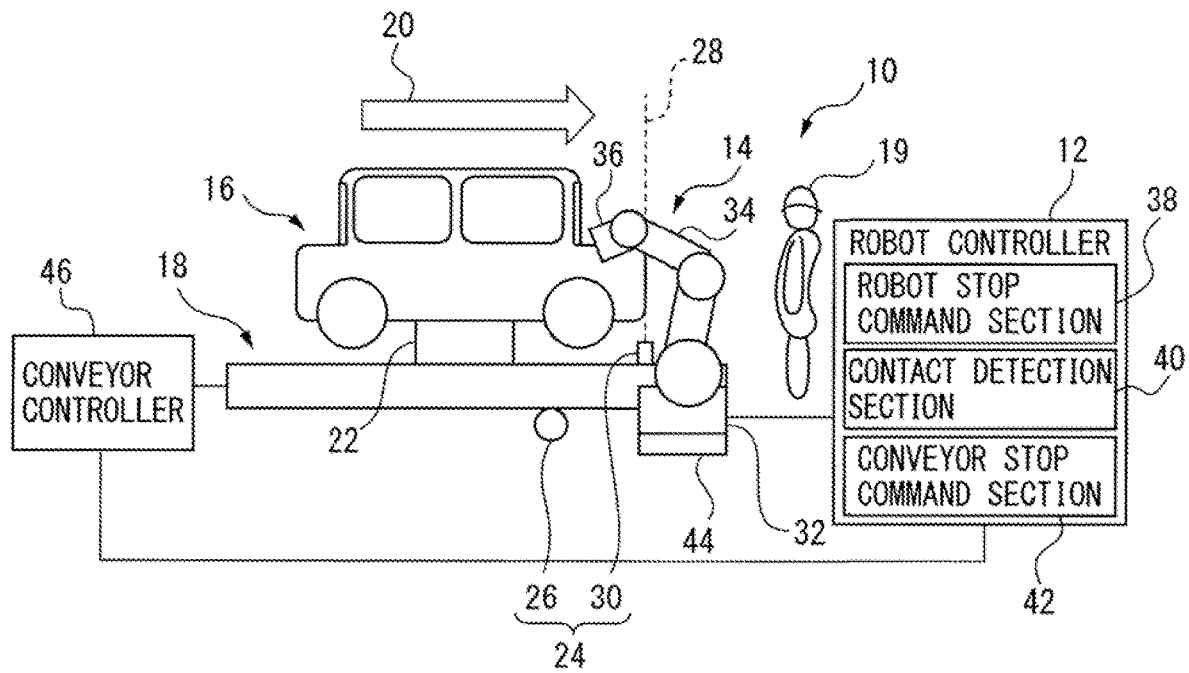
FIG. 1 shows an example of a configuration of a collaborative robot system.

FIG. 1 shows an example of a schematic configuration of a collaborative robot system including a robot controller according to a preferred embodiment. Collaborative robot system 10 has: a robot controller 12; a collaborative robot (hereinafter, also referred to as a robot) 14 controlled by robot controller 12; and a conveying device (or a conveyor) 18 configured to convey a workpiece (in the drawing, a car body) 16 corresponding to a work object of robot 14, wherein robot 14 is configured to perform a predetermined operation for car body 16. In collaborative robot system 10, a human (operator) 19 can carry out a predetermined operation for workpiece 16 (e.g., attaching or assembling components to workpiece 16), and thus operator 19 and robot 14 share a common working area. Therefore, operator 19 may accidentally contact or collide with robot 14.

Conveyor 18 may have various structures such as a belt conveyor, a skid conveyor and an overhead conveyor, etc., configured to convey designated workpiece 16. Concretely, conveyor 18 has: a convey section 22 configured to hold workpiece 16 and move in a predetermined convey direction (in the drawing, from left to right as indicated by an arrow 20); and a position detection section 24 configured to detect the position of convey section 22 (or workpiece 16). For example, position detection section 24 may have an encoder 26 arranged in conveyor 18 (concretely, attached to a motor, etc., for driving convey section 22), and an infrared sensor 30 configured to detect that the workpiece has passed through a predetermined convey directional position (as exemplified by a dashed line 28).

In collaborative robot system 10, a value of encoder 26 when workpiece 16 passes through position 28 is stored, and the values (outputs) of encoder 26 are obtained at predetermined time intervals. By virtue of this, the position of convey section 22 (workpiece 16) relative to robot 14, the velocity of convey section 22, and a coasting distance (as explained below), etc., can be calculated in real-time. Alternatively, as the position detection section, a two-dimensional sensor such as a camera, an area sensor or a three-dimensional sensor (not shown) may be arranged at an upper side or a lateral side of conveyor 18. When the camera is used, based on a processing result of an image of the camera obtained at predetermined time intervals, the positional relationship between workpiece 16 and robot 14 can be calculated at the predetermined time intervals. Otherwise, the positional relationship between robot 14 and workpiece 16 may be previously stored in a memory, etc., and then, when the operation (or a series of motions) of robot 14 for workpiece 16 is to be taught, the robot controller may judge which of a first and second states (as explained below) corresponds to the positional relationship when conveyor 18 starts an stop operation. In such a case, the unit (e.g., a processor) for performing the judgment may correspond to the position detection section.

For example, robot 14 may be a multi-jointed industrial robot having six axes, and may have: a base section 32 located at a position (e.g., a floor near conveyor 18) different from the location of convey section 22; a movable section 34, such as a robot arm, movably attached to base section 32; an end effector 36 attached to a front end of robot arm 34. Robot 14 is configured to perform a predetermined operation (e.g., attaching components (not shown) to workpiece 16, and processing a part of workpiece 16, etc.), based on a command from robot controller 12.

Robot controller 12 has a robot stop command section 38 configured to output a robot stop command for stopping the motion of robot 14 when convey section 22 of conveyor 18 starts the stop operation thereof. The robot stop command includes at least one of: a first stop command by which, when movable section 34 of robot 14 is positioned anterior to workpiece 16 with respect to convey direction 20, movable section 34 is moved at a higher velocity than convey section 22 with respect to convey direction 20, and then movable section 34 is stopped after movable section 34 travels a second coasting distance which is longer than a first coasting distance of convey section 22 with respect to convey direction 20; and a second stop command by which, when movable section 34 of robot 14 is positioned posterior to workpiece 16 with respect to convey direction 20, movable section 34 is moved at a lower velocity than convey section 22 with respect to convey direction 20, and then movable section 34 is stopped after movable section 34 travels a third coasting distance which is shorter than the first coasting distance of convey section 22 with respect to convey direction 20.

Optionally, robot controller 12 may have: a contact detection section 40 configured to detect that an object (e.g., a human or an article other than workpiece 16) comes into contact with robot 14; and a convey stop command section 42 configured to output a convey stop command by which conveyor 18 (convey section 22) is stopped when contact detection section 40 detects that the object comes into contact with robot 14. For example, the contact against robot 14 can be detected by transmitting an output (e.g., a signal) from a sensor (e.g., a contact sensor arranged on a surface of robot 14, a torque sensor provided to each axis of robot 14 or a six-axis force sensor positioned at a lower portion of base section 32) to contact detection section 40 of robot controller 12. In addition, a timing when robot stop command section 38 transmits the robot stop command to robot 14 and a timing when convey stop command section 42 transmits the convey stop command to conveyor 18 may be the same, or may be different from each other.

Robot controller 12 may have an input section such as a keyboard or a touch panel (not shown), so that operator 19 can input or configure various settings. The components of robot controller 12 (e.g., robot stop command section 38, contact detection section 40 and convey stop command section 42) may be constituted as software for activating a processor such as a CPU or a computer. Alternatively, the components may be realized as hardware such as a processor and a memory, configured to execute at least a part of the processes of the software.

The convey stop command may be transmitted to a conveyor controller 46 configured to control conveyor 18. For example, conveyor controller 46 has an arithmetic processing unit (processor) and a storage unit (memory), and executes a stop operation of convey section 22 based on the convey stop command. In this regard, the stop operation for convey section 22 is started not only when the contact against the robot is detected, but also when convey section 22 should be promptly stopped for safety (e.g., when an abnormality occurs in conveyor 18 or robot 14, etc.). In addition, (the function of) conveyor controller 46 may be incorporated in robot controller 12.

Figure 2:
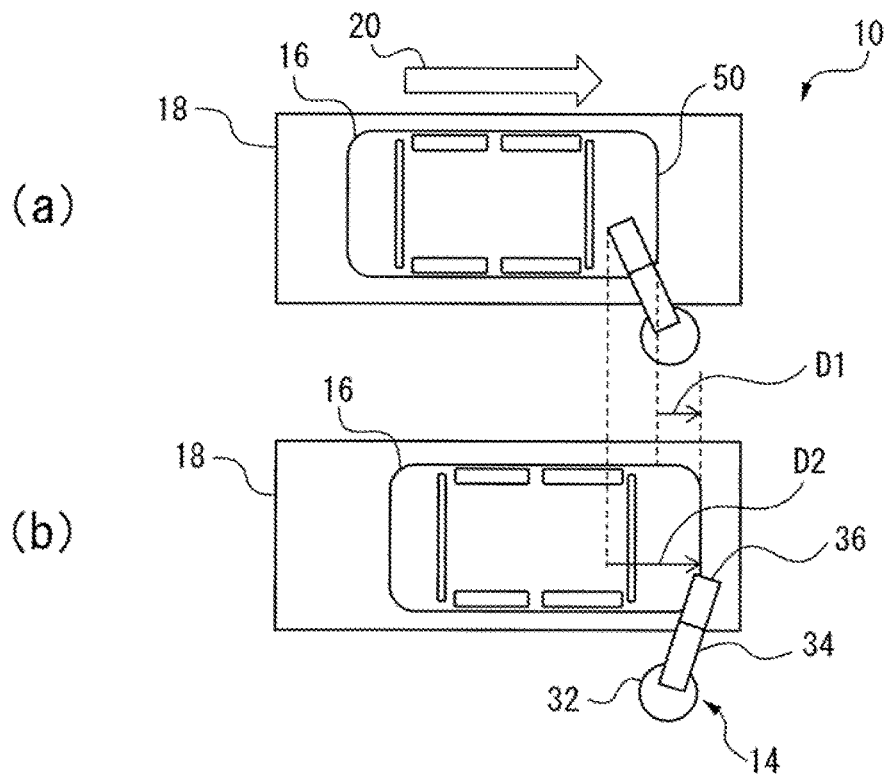
FIG. 2 shows the system of FIG. 1 viewed from the above, wherein part (a) exemplifies a state in which a robot is positioned anterior to a workpiece with respect to a convey direction, and part (b) exemplifies a state in which the robot and a conveyer coast from the state of (a) part.

Next, a stop operation of robot 14, when the stop operation of convey section 22 is started, will be explained. FIG. 2 shows system 10 of FIG. 1 viewed from the above, and represents the positional relationship between workpiece 16 and movable section 34 (or end effector 36) of robot 14, immediately after the convey stop command due to the contact detection regarding the robot, etc. First, in a state indicated in a part (a) of FIG. 2, movable section 34 of robot 14 is positioned anterior to workpiece 16 with respect to convey direction 20. Therefore, the first stop command is output, by which movable section 34 is moved at a higher velocity than convey section 22 (workpiece 16) with respect to convey direction 20, and movable section 34 is stopped after movable section 34 travels a second coasting distance D2 which is longer than a first coasting distance D1 of convey section 22 with respect to convey direction 20. In other words, as shown in a part (b) of FIG. 2, due to the robot motion based on the first stop command, movable section 34 of robot 14 is moved so that the distance between movable section 34 and workpiece 16 is lengthened, and then movable section 34 is stopped.

In this regard, movable section 34 (end effector 36) may be moved in convey direction 20. Alternatively, movable section 34 may be moved in a direction different from convey direction 20 but including a component parallel to convey direction 20, as long as the minimum distance between movable section 34 and workpiece 16 is not shortened. In this case, the component parallel to convey direction 20 is set to a value higher than the movement velocity of workpiece 16.

Figure 3:
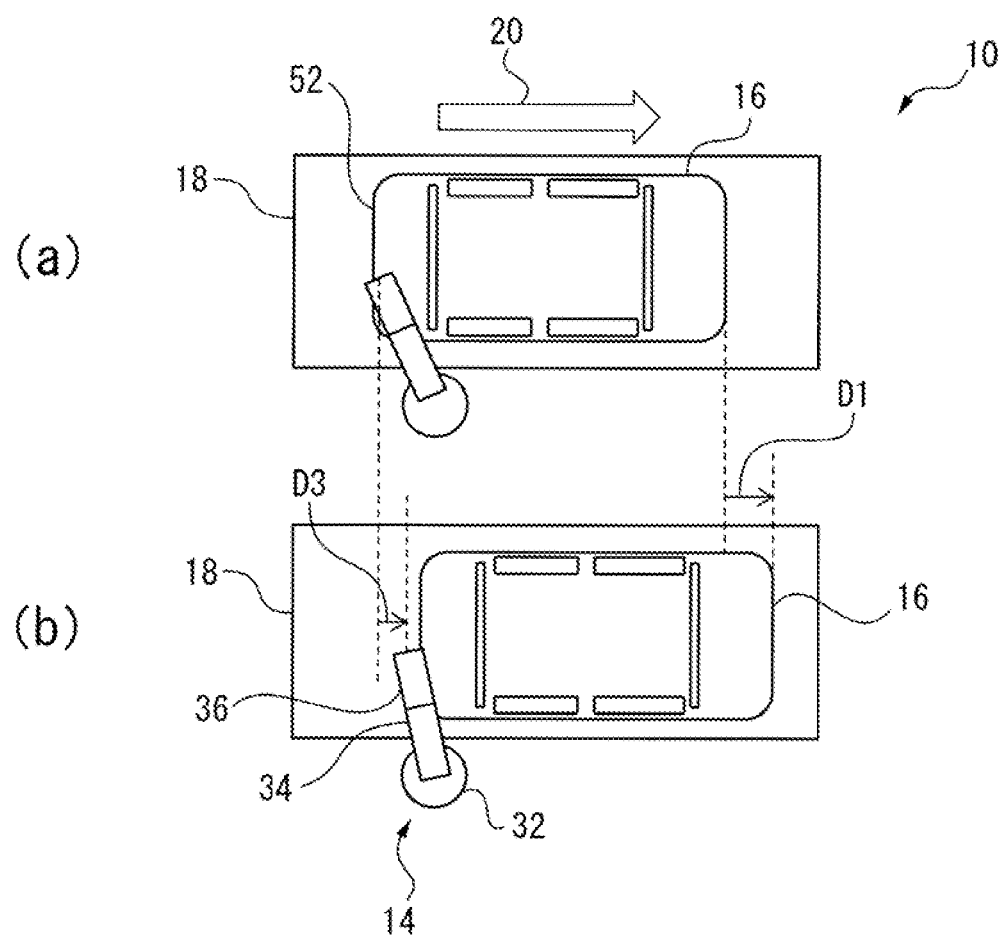
FIG. 3 shows the system of FIG. 1 viewed from the above, wherein part (a) exemplifies a state in which the robot is positioned posterior to the workpiece with respect to the convey direction, and part (b) exemplifies a state in which the robot and the conveyer coast from the state of (a) part.

On the other hand, in a state indicated in a part (a) of FIG. 3, movable section 34 of robot 14 is positioned posterior to workpiece 16 with respect to convey direction 20. Therefore, the second stop command is output, by which movable section 34 is moved at a lower velocity than convey section 22 (workpiece 16) with respect to convey direction 20, and movable section 34 is stopped after movable section 34 travels a third coasting distance D3 which is shorter than first coasting distance D1 of convey section 22 with respect to convey direction 20. In other words, as shown in a part (b) of FIG. 3, due to the robot motion based on the second stop command, movable section 34 of robot 14 is moved so that the distance between movable section 34 and workpiece 16 is lengthened, and then movable section 34 is stopped.

In this case, similarly to part (a) of FIG. 2, movable section 34 (end effector 36) may also be moved in convey direction 20. Alternatively, movable section 34 may be moved in a direction different from convey direction 20 but including a component parallel to convey direction 20, as long as the minimum distance between movable section 34 and workpiece 16 is not shortened. In this case, the component parallel to convey direction 20 is set to a value lower than the movement velocity of workpiece 16.

In the present disclosure, the condition that "the movable section of the robot is positioned anterior to the workpiece with respect to the convey direction" means the state in which the workpiece does not exist anterior to the position of the movable section (e.g., a representative point such as a tool center point) of the robot with respect to the convey direction, and even when the movable section is moved in the convey direction, the movable section does not contact or collide with the workpiece. In other words, when the movable section is moved forward in the convey direction from the state (hereinafter, referred to as a first state) in which "the movable section of the robot is positioned anterior to the workpiece with respect to the convey direction," the minimum distance between the workpiece and the movable section of the robot will be lengthened. For example, the state indicated in part (a) of FIG. 2 corresponds to the first state, while a state, in which movable section (or end effector 36) is positioned anterior to a front end 50 of workpiece 16 with respect to convey direction 20, may also correspond to the first state.

Similarly, in the present disclosure, the condition that "the movable section of the robot is positioned posterior to the workpiece with respect to the convey direction" means the state in which the workpiece does not exist posterior to the position of the movable section (e.g., the representative point such as a tool center point) of the robot with respect to the convey direction, and even when the movable section is moved in the direction opposite to the convey direction, the movable section does not contact or collide with the workpiece. In other words, when the movable section is moved backward in the convey direction from the state (hereinafter, referred to as a second state) in which "the movable section of the robot is positioned posterior to the workpiece with respect to the convey direction," the minimum distance between the workpiece and the movable section of the robot will be lengthened. For example, the state indicated in part (a) of FIG. 3 corresponds to the second state, while a state, in which movable section 34 (or end effector 36) is positioned posterior to a rear end 52 of workpiece 16 with respect to convey direction 20, may also correspond to the second state.

When an abnormality occurs in the collaboration system in which the robot and the operator share the common working area, it is desired that the conveyor and the robot be immediately stopped for safety of the operator. However, in general, when the conveyor receives the stop command, the conveyor cannot be immediately stopped, instead, the conveyor is stopped after traveling a coasting distance which depends on the velocity of the conveyor and the weight of the conveyed workpiece, etc. Therefore, in the prior art, the distance between the robot and the workpiece on the conveyor is shortened even after the robot is immediately stopped, and thus the operator may be sandwiched and injured between the workpiece and the robot.

In view of the above, in the present embodiment, in either case of FIG. 2 or FIG. 3, the robot is stopped after the robot is moved so that the distance between the robot and the workpiece is lengthened. Therefore, the distance between workpiece 16 and movable section 34 of robot 14 cannot be shortened, from the time that conveyor 18 starts the stop operation thereof to when convey section 22 is stopped after traveling certain first coasting distance D1. Accordingly, operator 19 is prevented from being sandwiched and injured between robot 14 and workpiece 16. Further, it is avoided that the workpiece collide with the robot, and that at least one of the workpiece and the robot is damaged.

In the embodiment of FIG. 2 or 3, first coasting distance D1 of convey section 22 of conveyor 18 is generally is within a range from several centimeters to several tens of centimeters, which depends on the velocity, etc., of the conveyor when the convey stop command is received. Coasting distance D2 of robot 14 in FIG. 2 is set to a value longer than coasting distance D1 of convey section 22, e.g., not more than 1.5 times, 2 times or 3 times of coasting distance D1. Further, coasting distance D3 of robot 14 in FIG. 3 is set to a value shorter than coasting distance D1 of convey section 22, e.g., not more than two-thirds, a half or one-third of coasting distance D1.

In the above embodiment, the movable section of the robot moves (coasts) in the same (convey) direction as the workpiece after the contact regarding the robot is detected (e.g., the stop command is output), whereas the movable section may be moved in a direction different from the convey direction. In such a case, the direction of movement of the movable section of the robot includes at least a component parallel to the convey direction of the workpiece, and the component is set to a value larger than the convey velocity of the workpiece in case that the movable section is positioned anterior to the workpiece with respect to the convey direction when the contact regarding the robot is detected. On the other hand, the component is set to a value smaller than the convey velocity of the workpiece in case that the movable section is positioned posterior to the workpiece with respect to the convey direction when the contact regarding the robot is detected.

In the above embodiment, the state (FIG. 2) in which movable section 34 of robot 14 is positioned anterior to workpiece 16 with respect to convey direction 20 when convey section 22 starts the stop operation, and the state (FIG. 3) in which movable section 34 of robot 14 is positioned posterior to workpiece 16 with respect to convey direction 20 when convey section 22 starts the stop operation, are explained. In addition to the above, an intermediate state, in which movable section 34 of robot 14 is positioned within an inner space of workpiece 16, may be possible. In the intermediate state, when the velocities or the coasting distances of robot 14 and convey section 22 are different from each other, movable section 34 may collide with workpiece 16. Therefore, in such a case, it is preferable that robot 14 be controlled so as to perform a following motion (i.e., moving in the same direction at the same velocity) with respect to workpiece 16.

According to the present disclosure, from the time that the conveyor starts the deceleration motion to when the conveyor is stopped, it can be avoided that the workpiece on the conveyor comes into contact with the robot, and that the human is sandwiched between the workpiece and the robot.

While the invention has been described with reference to specific embodiments, it will be understood, by those skilled in the art, that various changes or modifications may be made thereto without departing from the scope of the following claims.

The invention claimed is:

1. A robot controller configured to control a robot, the robot being configured to perform an operation for a workpiece conveyed by a convey section configured to move in a predetermined convey direction, and being located at a position different from the convey section, the robot controller comprising:

a robot stop command section configured to output a robot stop command for stopping a motion of the robot when the convey section starts a stop motion, wherein the robot stop command includes at least one of:

a first stop command by which, when a movable section of the robot is positioned anterior to the workpiece with respect to the convey direction, the movable section is moved at a higher velocity than the convey section with respect to the convey direction, and the movable section is stopped after the movable section travels a second coasting distance which is longer than a first coasting distance of the convey section with respect to the convey direction; and a second stop command by which, when the movable section of the robot is positioned posterior to the workpiece with respect to the convey direction, the movable section is moved at a lower velocity than the convey section with respect to the convey direction, and the movable section is stopped after the movable section travels a third coasting distance which is shorter than the first coasting distance of the convey section with respect to the convey direction.

2. The robot controller as set forth in claim 1, further comprising:

a contact detection section configured to detect that an object comes into contact with the robot; and a convey stop command section configured to output a convey stop command by which the convey section is stopped when the contact detection section detects that the object comes into contact with the robot.

3. A robot control method of controlling a robot, the robot being configured to perform an operation for a workpiece conveyed by a convey section configured to move in a predetermined convey direction, and being located at a position different from the convey section, the robot control method comprising:

outputting a robot stop command for stopping a motion of the robot when the convey section starts a stop motion, wherein the robot stop command includes at least one of:

a first stop command by which, when a movable section of the robot is positioned anterior to the workpiece with respect to the convey direction, the movable section is moved at a higher velocity than the convey section with respect to the convey direction, and the movable section is stopped after the movable section travels a second coasting distance which is longer than a first coasting distance of the convey section with respect to the convey direction; and a second stop command by which, when the movable section of the robot is positioned posterior to the workpiece with respect to the convey direction, the movable section is moved at a lower velocity than the convey section with respect to the convey direction, and the movable section is stopped after the movable section travels a third coasting distance which is shorter than the first coasting distance of the convey section with respect to the convey direction.

* * * * *